(12) United States Patent
Sobue et al.

(10) Patent No.: US 9,296,336 B2
(45) Date of Patent: Mar. 29, 2016

(54) IMAGE DISPLAY DEVICE AND IMAGE DISPLAY METHOD

(75) Inventors: Yuka Sobue, Nagoya (JP); Ryuji Okamura, Toyota (JP); Chika Morimoto, Toyota (JP); Yu Hiei, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 54 days.

(21) Appl. No.: 14/347,996

(22) PCT Filed: Sep. 29, 2011

(86) PCT No.: PCT/JP2011/072468
§ 371 (c)(1),
(2), (4) Date: Mar. 27, 2014

(87) PCT Pub. No.: WO2013/046408
PCT Pub. Date: Apr. 4, 2013

(65) Prior Publication Data
US 2014/0225723 A1   Aug. 14, 2014

(51) Int. Cl.
| | | |
|---|---|---|
| *B60Q 1/00* | (2006.01) | |
| *B60R 1/00* | (2006.01) | |
| *G08G 1/16* | (2006.01) | |
| *H04N 5/225* | (2006.01) | |
| *G06K 9/00* | (2006.01) | |
| *H04N 7/18* | (2006.01) | |

(52) U.S. Cl.
CPC .............. *B60R 1/00* (2013.01); *G06K 9/00805* (2013.01); *G08G 1/166* (2013.01); *H04N 5/2252* (2013.01); *B60R 2300/305* (2013.01); *B60R 2300/70* (2013.01); *H04N 7/18* (2013.01)

(58) Field of Classification Search
CPC ........................................................ B60R 1/00
USPC .............. 340/435, 436, 438, 439, 932.2, 937; 138/142, 148
See application file for complete search history.

(56) References Cited

U.S. PATENT DOCUMENTS

| | | | | |
|---|---|---|---|---|
| 5,670,935 A | * | 9/1997 | Schofield et al. .............. 340/461 |
| 6,005,611 A | * | 12/1999 | Gullichsen et al. ......... 348/211.6 |
| 7,069,128 B2 | * | 6/2006 | Iwama ............................ 701/36 |
| 8,570,188 B2 | * | 10/2013 | Yamashita ................ B60R 1/00 340/435 |
| 2008/0246843 A1 | * | 10/2008 | Nagata et al. .................. 348/148 |
| 2013/0054086 A1 | | 2/2013 | Lo et al. |

FOREIGN PATENT DOCUMENTS

| | | |
|---|---|---|
| EP | 1288618 A2 | 3/2003 |
| JP | 2009-065483 A | 3/2009 |
| JP | 2010-228471 | 10/2010 |

* cited by examiner

*Primary Examiner* — Tai T Nguyen
(74) *Attorney, Agent, or Firm* — Kenyon & Kenyon LLP

(57) ABSTRACT

In a driving support display device 1 that includes a rear view wide angle camera 11, and an ECU 20 and a display 30 that display a rearward image captured by the rear view wide angle camera 11, a display control section 25 of the ECU 20 and the display 30 is capable of displaying a moving object approaching detection frame 210 that supports driving of a driver of a host vehicle 100 and a pedestrian detection frame 212 while dividing the rearward image into plural screens for display, and changes the number of the screens to be displayed between when the moving object approaching detection frame 210 is displayed and when the moving object approaching detection frame 210 is not displayed. Thus, the driver can easily recognize operation and non-operation of a system that displays the moving object approaching detection frame 210.

5 Claims, 17 Drawing Sheets

IMAGE DISPLAY DEVICE AND IMAGE DISPLAY METHOD

CROSS-REFERENCE TO RELATED APPLICATIONS

This is a national phase application based on the PCT International Patent Application No. PCT/JP2011/072468 filed on Sep. 29, 2011, the entire contents of which is incorporated herein by reference.

TECHNICAL FIELD

The present invention relates to an image display device that displays an image of a surrounding area of a vehicle and an image display method thereof.

BACKGROUND ART

During micro-low speed traveling, a driver may not see a desired place due to a blind spot in a host vehicle and a blind spot due to an obstruction such as a wall or a peripheral vehicle. Thus, a device that captures the blind spot in the host vehicle and the blind spot due to the obstruction using a camera and displays the captured image using a display has been proposed. For example, in a device disclosed in Patent Literature 1, with respect to an image captured by a wide angle camera having a visual angle of 180 degrees, a range of 120 degrees in the visual angle of 180 degrees is usually displayed on a display, to thereby form a parking support image. If an obstruction is detected, the device displays the range of the wide angle of 180 degrees on the display, to thereby form a parking support image.

CITATION LIST

Patent Literature

[Patent Literature 1] Japanese Unexamined Patent Application Publication No. 2009-65483

SUMMARY OF INVENTION

Technical Problem

However, in the above-mentioned technique, the system has an operating condition that the vehicle is traveling in reverse at a low speed lower than a predetermined threshold value. However, in the above-mentioned technique, for example, when the vehicle is traveling in reverse at a high speed equal to or greater than the predetermined threshold value and the driver does not recognize that the system of the device does not operate, the driver may misunderstand that the driver enjoys the support of the system although the system is under a non-operating condition. In this case, although an obstruction is present, a screen is not switched to an image of the wide angle. Thus, the driver may misunderstand that there is no obstruction for the vehicle to travel around. Accordingly, the device in the related art has a problem to resolve regarding easy recognition of the operation and non-operation of the system.

In order to solve the above problems, an object of the invention is to provide an image display device and an image display method for which operation and non-operation of a system that supports driving of a driver are easily recognizable.

Solution to Problem

According to an embodiment of the invention, there is provided an image display device including: an image obtaining unit that obtains an image of a surrounding area of a vehicle; and an image display unit that displays the image of the surrounding area obtained by the image obtaining unit; in which the image display unit is capable of displaying a driving support display indicating approach of an object included in the image of the surrounding area while dividing the image of the surrounding area into a plurality of screens for display, and changes the number of the screens to be displayed between when the driving support display is displayed and when at least a part of the driving support display is not displayed.

According to this configuration, in the image display device including the image obtaining unit that obtains the image of the surrounding area of the vehicle, and the image display unit that displays the image of the surrounding area obtained by the image obtaining unit, the image display unit is capable of displaying the driving support display indicating the approach of the object included in the image of the surrounding area while dividing the image of the surrounding area into the plurality of screens for display, and changes the number of the screens to be displayed between when the driving support display is displayed and when at least the part of the driving support display is not displayed. Thus, a driver can easily recognize operation and non-operation of a system that displays the driving support display.

Further, the image display unit is capable of dividing the image of the surrounding area into a left lateral screen, a central screen and a right lateral screen for display, may display the left lateral screen, the central screen and the right lateral screen when the driving support display is displayed, and may display only the central screen when at least the part of the driving support display is not displayed.

According to this configuration, the image display unit is capable of dividing the image of the surrounding area into the left lateral screen, the central screen and the right lateral screen for display, displays the left lateral screen, the central screen and the right lateral screen when the driving support display is displayed, and displays only the central screen when at least the part of the driving support display is not displayed. Thus, the driver can easily recognize operation and non-operation of the system that displays the driving support display. Further, since the central screen is displayed even in the non-operation of the system that displays the driving support display, it is possible to use the central screen for environmental monitoring.

Further, the image display unit may display, when an object included in the image of the surrounding area of either of the left lateral screen and the right lateral screen approaches the vehicle, the driving support display indicating the approach of the object.

According to this configuration, the image display unit displays, when the object included in the image of the surrounding area of either of the left lateral screen and the right lateral screen approaches the vehicle, the driving support display indicating the approach of the object. Thus, the driver can easily recognize that an object approaches in a lateral direction even when the driver watches the central screen.

In this case, the image display unit may not display, when either of the speed and the steering angle of the vehicle is equal to or greater than a predetermined threshold value, at least the part of the driving support display.

According to this configuration, the image display unit does not display, when either of the speed and the steering angle of the vehicle is equal to or greater than a predetermined threshold value, the driving support display. As a method of detecting approach of an object, there is radar, lidar, sonar, image recognition or the like, but when the speed or steering angle of a vehicle is large, erroneous detection, non-detection or the like may occur. The erroneous detection or non-detection causes a driver to have a distrust of the system. Thus, as at least the part of the driving support display is not displayed when the speed or steering angle of the vehicle is equal to or greater the threshold value, it is possible to prevent the erroneous detection or non-detection of the object that approaches the vehicle.

Further, according to another embodiment of the invention, there is provided an image display method including: obtaining an image of a surrounding area of a vehicle; and displaying the image of the surrounding area obtained in the obtaining of the image of the surrounding area. Displaying a driving support display indicating approach of an object included in the image of the surrounding area while dividing the image of the surrounding area into a plurality of screens to be displayed is possible in the displaying of the image of the surrounding area, and the number of the screens to be displayed between when the driving support display is displayed and when at least a part of the driving support display is not displayed, is changed, in the displaying of the image of the surrounding area.

Advantageous Effects of Invention

According to the embodiments of the invention, it is possible to easily recognize operation and non-operation of a system that supports driving of a driver.

DESCRIPTION OF EMBODIMENTS

Figure 1:
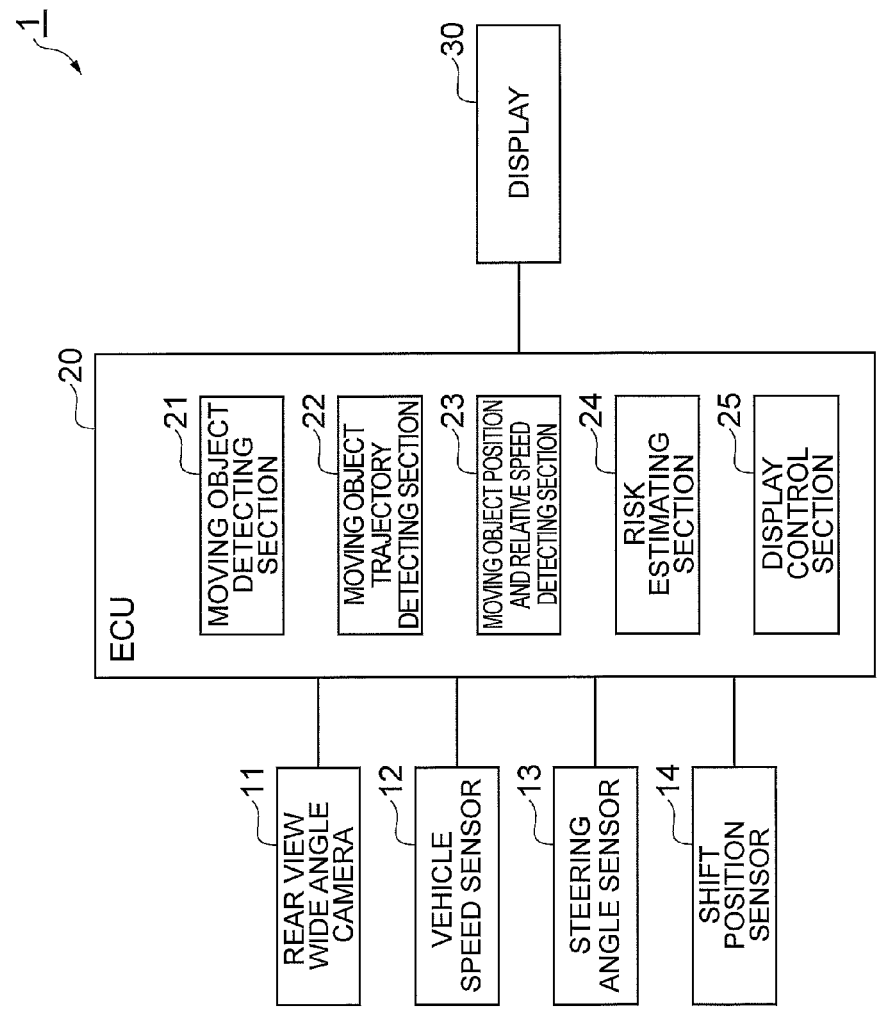
FIG. 1 is a block diagram illustrating a configuration of a driving support display device according to an embodiment of the invention.

Hereinafter, an image display device and an image display method according to an embodiment of the invention will be described with reference to the accompanying drawings. As shown in FIG. 1, the image display device according to the present embodiment is configured as a driving support display device 1. The driving support display device 1 includes a rear view wide angle camera 11, a vehicle speed sensor 12, a steering angle sensor 13, an ECU 20 and a display 30. The driving support display device 1 of the present embodiment is installed in a vehicle, and provides a rearward image to a driver with respect to a vehicle.

The rear view wide angle camera 11 is a camera for capturing the rearward image of the vehicle. The rear view wide angle camera 11 is a wide angle camera having a visual angle of about 180 degrees. The vehicle speed sensor 12 is a sensor that detects the speed of the vehicle. For example, the vehicle speed sensor 12 detects the rotational speed of an axle of the vehicle, to thereby detect the speed of the vehicle. The steering angle sensor 13 is a sensor that detects the steering angle of the vehicle. A shift position sensor is a sensor that detects whether the position of the shift of a transmission of the vehicle is disposed in a reverse (R) position.

The electronic control unit (ECU) 20 generally controls the driving support display device 1. The ECU 20 is an electronic control unit that includes a central processing unit (CPU), a read only memory (ROM), a random access memory (RAM) and the like. The ECU 20 causes an application program stored in the ROM to be downloaded to the RAM and to be executed in the CPU, to thereby execute a variety of operations relating to image display.

When the ECU 20 is divided according to functions thereof, the ECU 20 includes a moving object detecting section 21, a moving object trajectory detecting section 22, a moving object position and relative speed detecting section 23, a risk estimating section 24 and a display control section 25.

As described later, the moving object detecting section 21 detects an object in an image captured by the rear view wide angle camera 11, by a pattern matching method of detecting an object included in an image by comparing the image with a predetermined pattern, and an optical flow method of detecting an object included in an image by analyzing moving direction and speed of a point in the image over time. As described later, when the object is detected by the pattern matching, the moving object detecting section 21 can detect a stationary object.

The moving object trajectory detecting section 22 detects a trajectory of the object in the image, from the position and movement of the object in the image detected by the moving object detecting section 21 and the movement of the vehicle detected by the vehicle speed sensor 12 and the steering angle sensor 13.

The moving object position and relative speed detecting section 23 detects the position of the object in the image and the relative speed thereof with respect to the vehicle, on the basis of the trajectory of the object in the image detected by the moving object trajectory detecting section 22.

The risk estimating section 24 estimates the risk of the object in the image, on the basis of the position of the object in the image and the relative speed detected by the moving object position and relative speed detecting section 23.

As described later, the display control section 25 displays a driving support display for supporting driving of the driver in the display 30, from the position and the relative speed of the object detected by the moving object position and relative speed detecting section 23, the risk estimated by the risk estimating section 24 and the state of the vehicle detected by the vehicle speed sensor 12, the steering angle sensor 13 and the shift position sensor 14.

The display 30 displays the rearward image captured by the rear view wide angle camera 11. For example, the display 30 may use a monitor installed around the driver's seat or a head-up display that displays an image on a front glass or the like.

In the present embodiment, the driving support display device 1 detects an object around the vehicle by image recognition for the image captured by the rear view wide angle camera 11. However, a sensor such as radar, lidar or sonar may be separately provided to detect the object around the vehicle.

Figure 2:
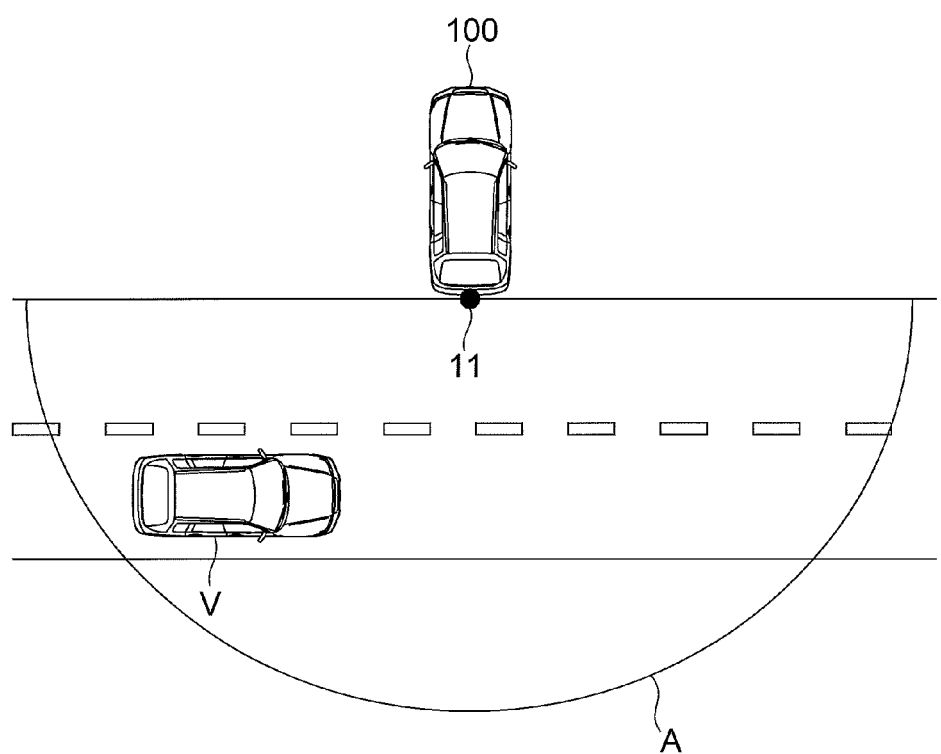
FIG. 2 is a plan view illustrating a situation where a driving support display device according to the embodiment is applied.

Hereinafter, an operation of the driving support display device 1 of the present embodiment will be described. As shown in FIG. 2, the driving support display device 1 of the present embodiment is applied to support driving of a driver who has difficulty seeing the back of a host vehicle 100 when the host vehicle 100 from a parking spot to a road while traveling in reverse, and when the host vehicle 100 enters the parking spot while traveling in reverse. The driving support display device 1 detects another vehicle V or the like in a support area A that is an imaging range of the rear view wide angle camera 11, and reports the result to the driver.

Figure 3:
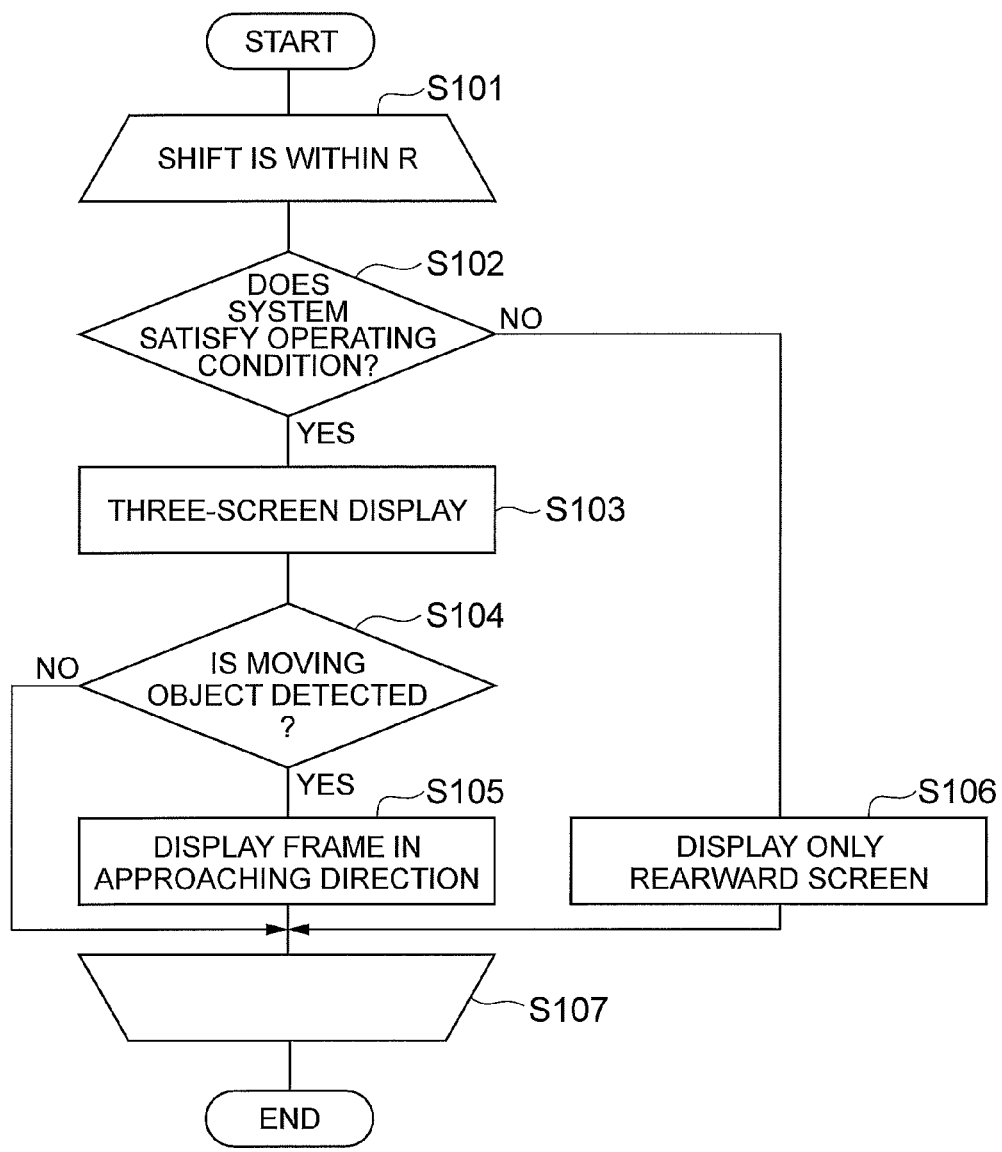
FIG. 3 is a flowchart illustrating a basic operation of the driving support display device according to the embodiment.

First, the basic operation of the driving support display device 1 of the present embodiment will be described. As shown in FIG. 3, in the driving support display device 1 of the present embodiment, the shift position sensor 14 enters an operating state while the position of the shift of the transmission of the host vehicle 100 is disposed in the reverse position (S101).

The display control section 25 of the ECU 20 of the driving support display device 1 determines whether the detection values of the vehicle speed sensor 12 and the steering angle sensor 13 satisfy a system operating condition for notifying of a moving object on a lateral side, in a driving support system of the driving support display device 1 (S102).

As the method of detecting the moving object, there is radar, lidar, sonar, image recognition or the like, but erroneous detection or non-detection may occur according to a condition such as the speed or steering angle of the host vehicle 100, due to performance of the sensor or accuracy of the image recognition. The erroneous detection and non-detection cause the driver to have a distrust of the driving support system of the driving support display device 1. Thus, in the present embodiment, the driving support system that notifies of the moving object on the lateral side is set to a non-operating state when the speed or steering angle is equal to or greater than a predetermined threshold value.

For example, if the driving support display device 1 notifies the driver of the moving object on the lateral side of the host vehicle 100 only when the host vehicle 100 starts traveling as in the situation shown in FIG. 2, it is possible to set a case where the speed is around 0 km/h, is equal to or less than 0.1 km/h to 3 km/h, is or equal to or less than 4 km/h as an operating condition of the driving support system that notifies the driver of the moving object on the lateral side of the host vehicle 100.

Figure 4:
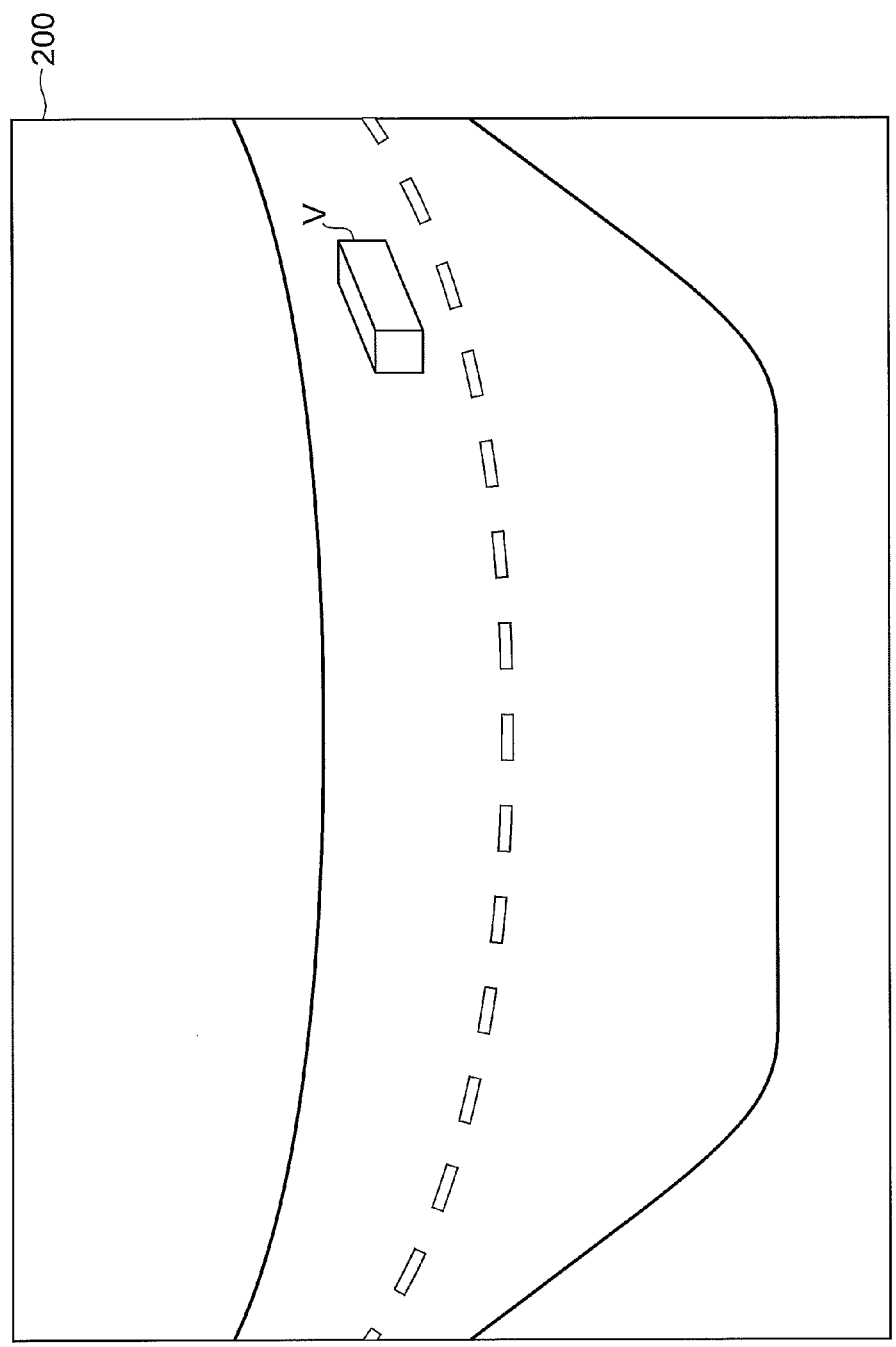
FIG. 4 is a diagram illustrating an unprocessed original image captured by a rear view wide angle camera.

In the case of the operating condition of the driving support system that notifies of the moving object on the lateral side (S102), the display control section 25 divides the image captured by the rear view wide angle camera 11 into three parts to be displayed in the display 30 (S103). As shown in a display screen 200 in FIG. 4, the original image captured by the rear view wide angle camera 11 has a visual angle of 180 degrees. In right and left edge portions of the image, distortion occurs due to aberration of a wide angle lens, in which the image is reduced in size as it goes to the right and the left edge portions and appears in the upper area.

Figure 5:
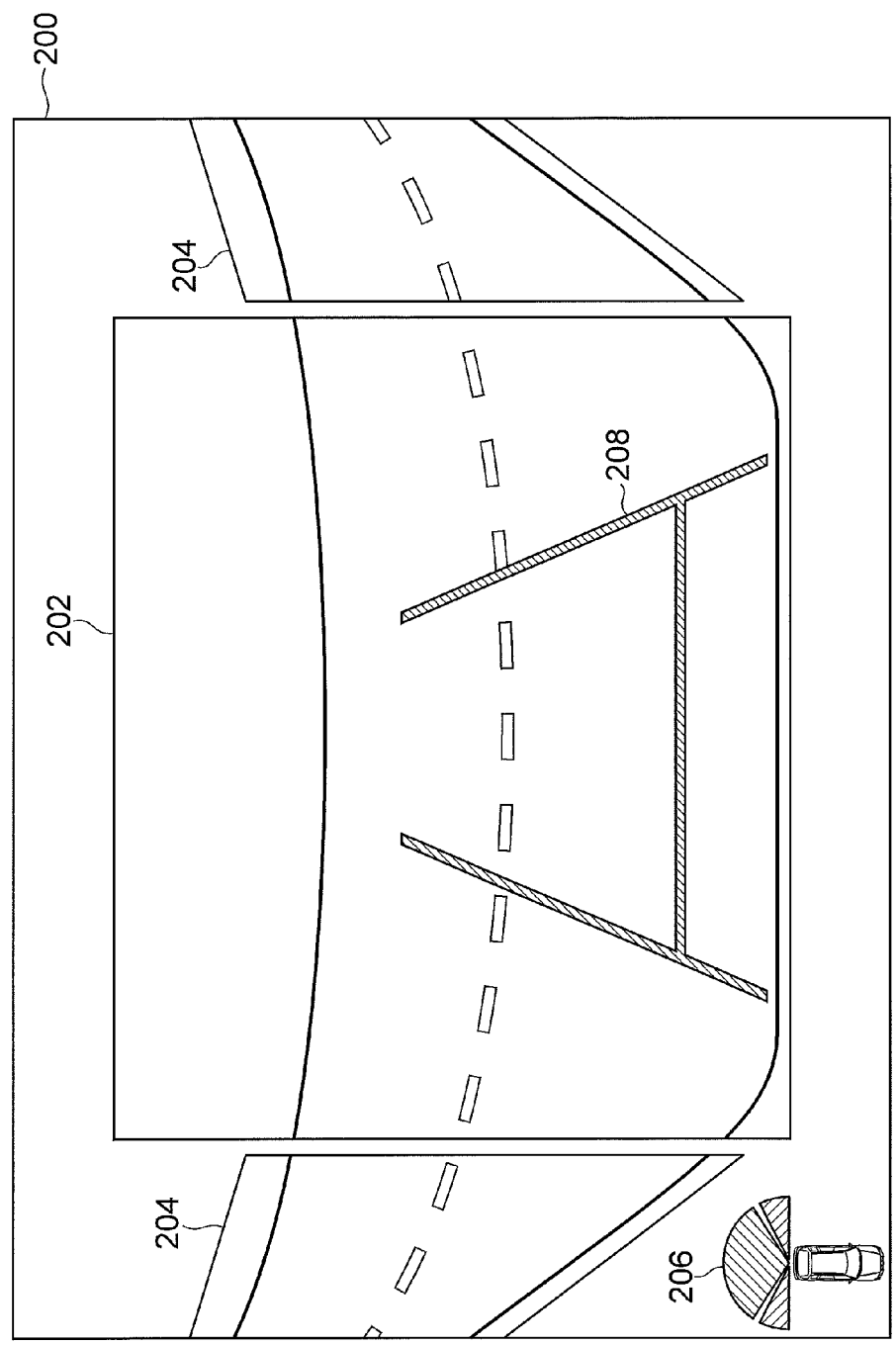
FIG. 5 is a diagram illustrating a display image when an approaching moving object is not present during operation of a driving support display system according to the embodiment.

In the present embodiment, as shown in FIG. 5, the image captured by the rear view wide angle camera 11 is divided into three parts of right and left rear lateral screens 204 and a central rearward screen 202, to be displayed in the display screen 200. A predetermined interval is provided between the right and the left rear lateral screens 204 and the central rearward screen 202 so that the driver easily recognizes that the image captured by the rear view wide angle camera 11 is divided. Here, the interval may be about 2 mm to 10 mm.

The display control section 25 performs distortion correction of correcting the distortion due to the aberration of the wide angle lens for images of the right and the left rear lateral screens 204. The display control section 25 displays the right and the left rear lateral screens 204 as trapezoids having vertical opposite sides on the right and left of the screens, corresponding to the distortion correction performed for the right and the left rear lateral screens 204. The display control section 25 performs the display so that the vertical height of the rear lateral screens 204 is narrowed toward the left side of the left rear lateral screen 204 and the right side of the right rear lateral screen 204. Further, the display control section 25 performs the display in which upper and lower sides of the left rear lateral screen 204 go toward an upper left side and upper and lower sides of the right rear lateral screen 204 go toward an upper right side.

The display control section 25 displays the central rearward screen 202 as rectangular. The display control section 25 displays a display range symbol 206 that indicates the position, with respect to the host vehicle 100, of the images of the right and the left rear lateral screens 204 and the central rearward screen 202. Further, the display control section 25 displays a vehicle width line 208 that is to be used by the driver as a driving reference in reverse traveling of the host vehicle 100, in the central rearward screen 202. Thus, the images of the right and the left rear lateral screens 204 and the central rearward screen 202 become different images.

Figure 6:
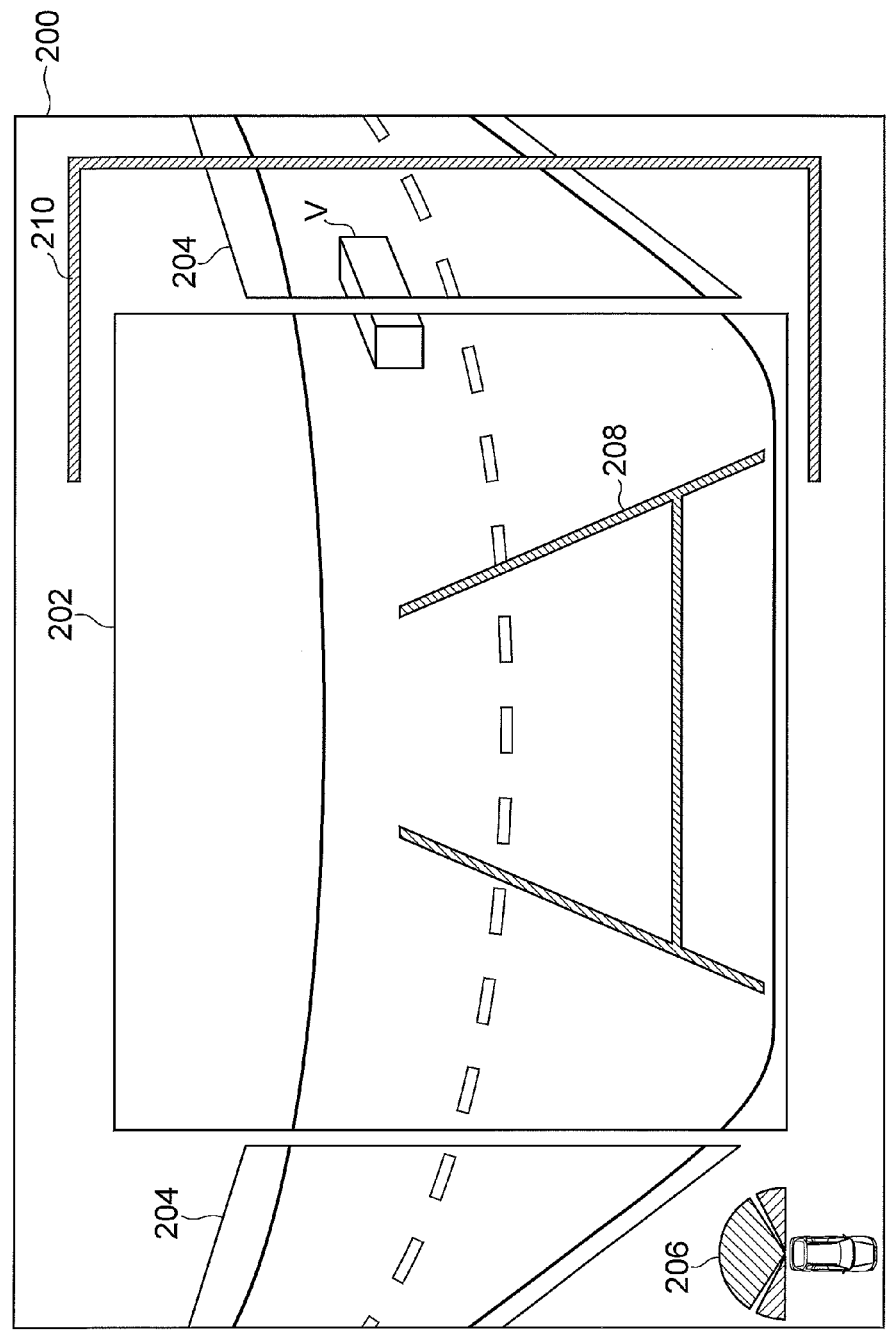
FIG. 6 is a diagram illustrating a display image when an approaching moving object is present during operation of the driving support display system according to the embodiment.

When the moving object detecting section 21 of the ECU 20 of the driving support display device 1 detects a moving object such as another vehicle V by an optical flow scheme (to be described later) (S104), the display control section 25 displays a moving object approaching detection frame 210 that surrounds parts of the rear lateral screen 204 and the rearward screen 202 on a side where the another vehicle V approaches the host vehicle 100 in an approaching direction of the another vehicle V, as shown in FIG. 6 (S105). The range surrounded by the moving object approaching detection frame 210 represents a detection range of the optical flow in the images of the rear lateral screen 204 and the rearward screen 202. In the present embodiment, a case where a stationary object such as a pedestrian is present in the vicinity of the host vehicle 100 is also reported to the driver, and an operation in this case will be described later.

Figure 7:
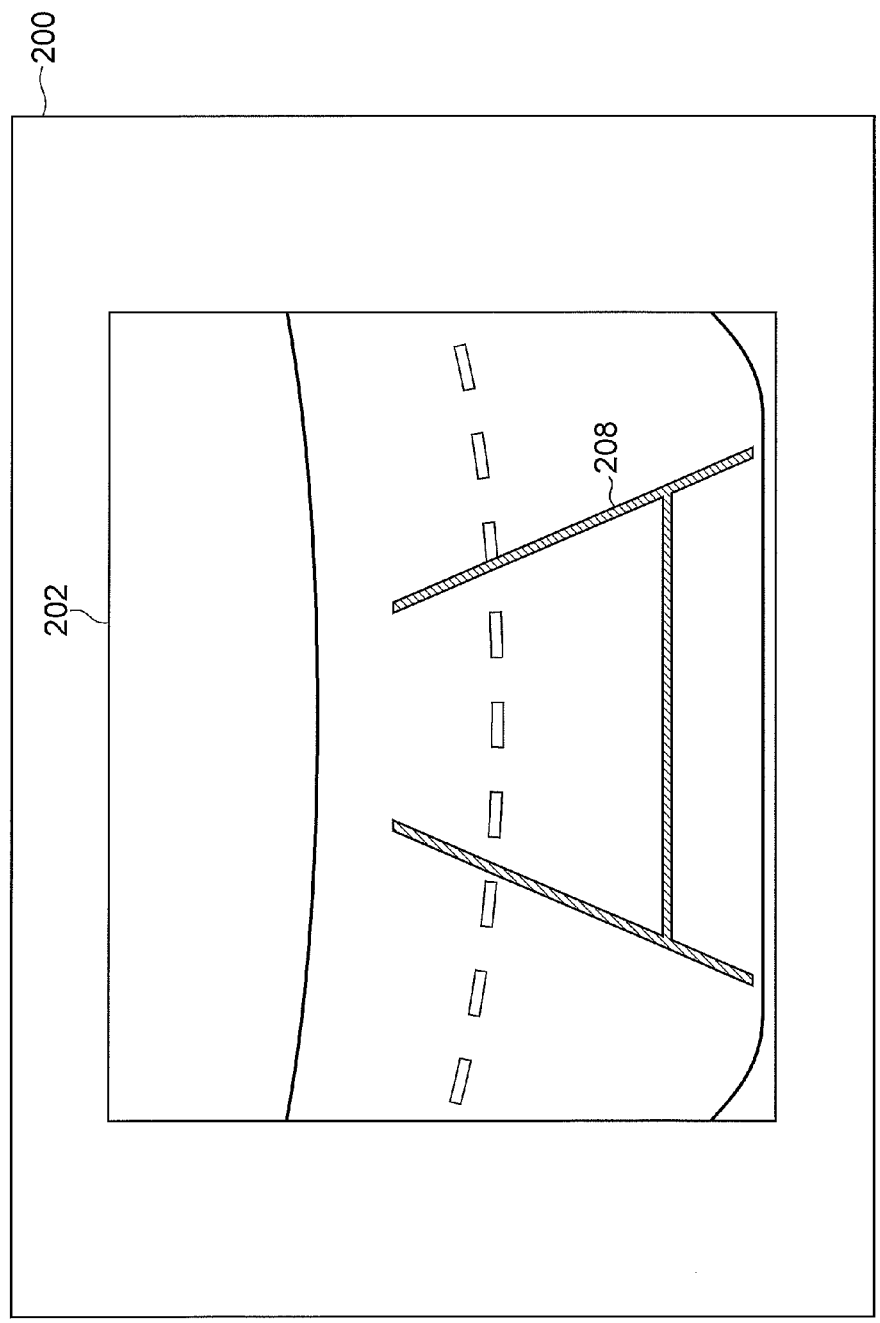
FIG. 7 is a diagram illustrating a display image when an approaching moving object is not present during non-operation of the driving support display system according to the embodiment.
Figure 8:
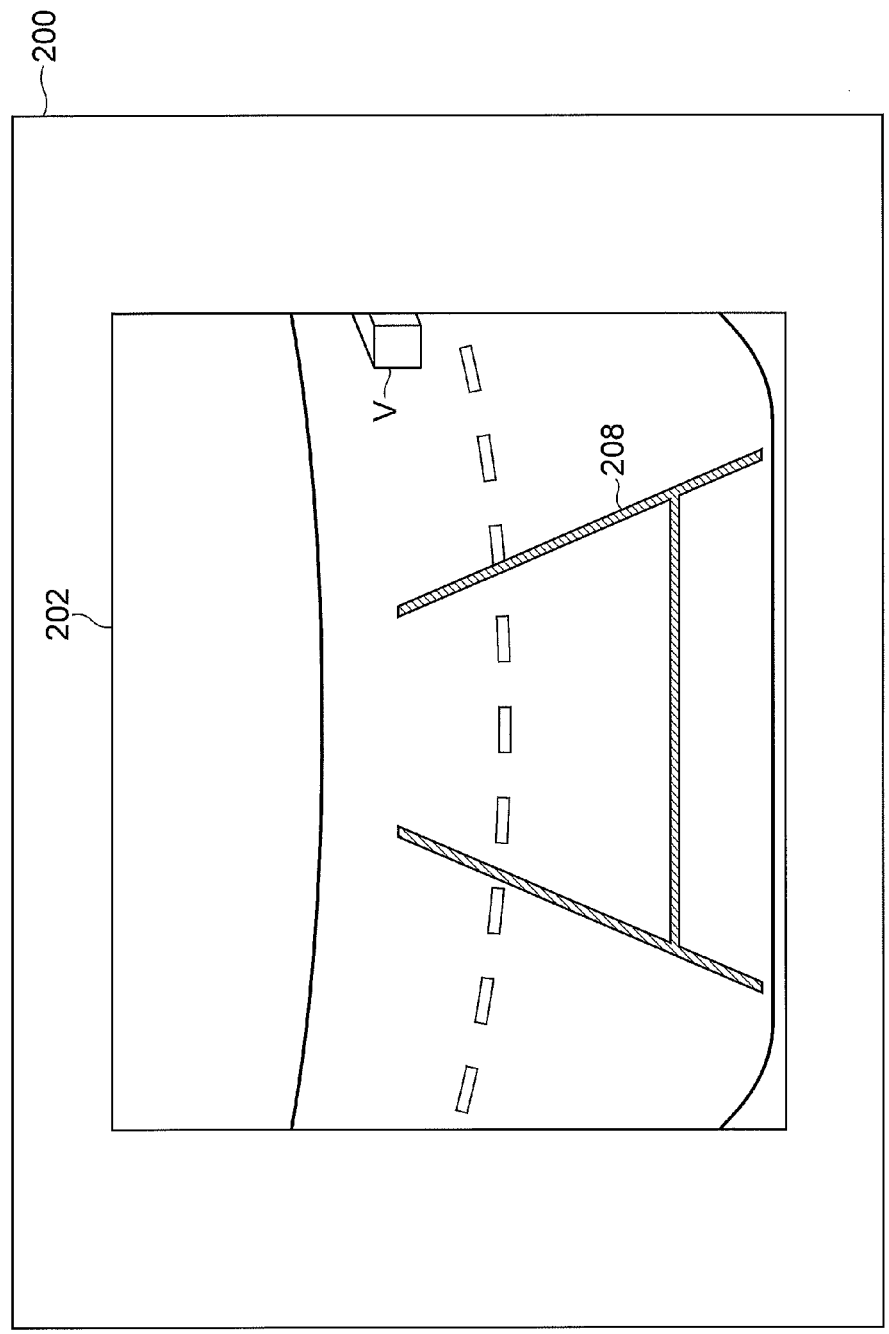
FIG. 8 is a diagram illustrating a display image when an approaching moving object is present during non-operation of the driving support display system according to the embodiment.

If the vehicle speed or steering angle exceeds a predetermined threshold value and an operating condition of the driving support system that notifies of a moving object on a lateral side is not satisfied (S102), the display control section 25 does not operate a part of the driving support system, and displays only the central rearward screen 202 as shown in FIG. 7 (S106). In this case, as shown in FIG. 8, the driver can recognize that an object such as another vehicle V comes close to the host vehicle 100 by the rearward screen 202. Thus, even when the driving support system that notifies of the moving object on the lateral side does not operate, it is possible to use the driving support display device 1 as a monitor that supports reverse driving of the host vehicle 100. Further, even when the driving support system that notifies of the moving object on the lateral side does not operate, it is possible to detect a pedestrian or the like in the image of the central rearward screen 202 by a pattern matching scheme (to be described later), and to report the result to the driver.

Figure 9:
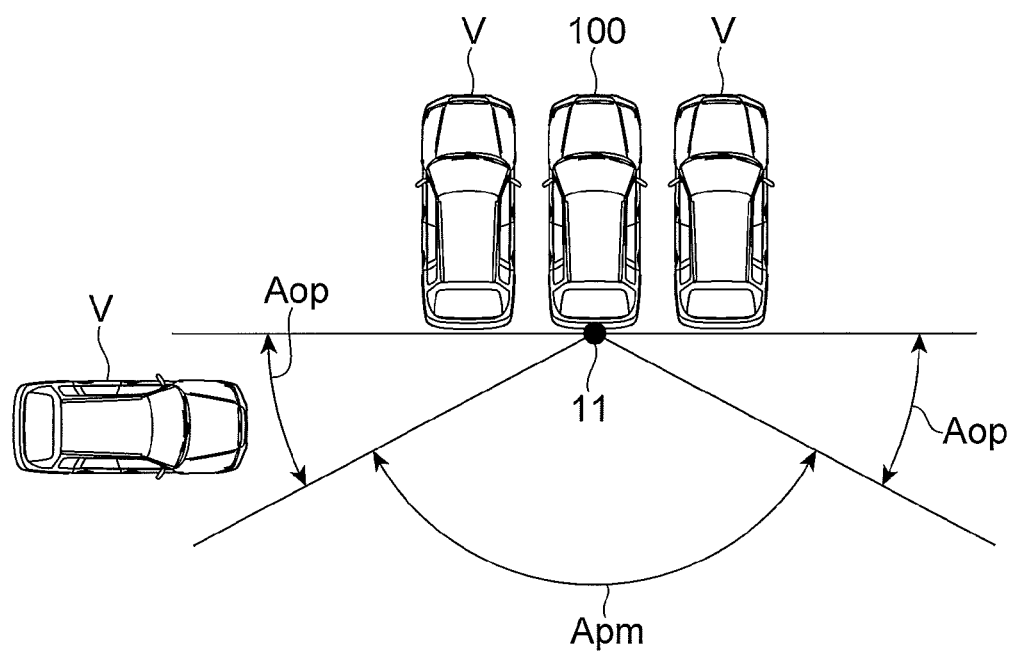
FIG. 9 is a plan view illustrating a situation when an object is present in an optical flow area of the driving support display device according to the embodiment.

Hereinafter, an operation of detecting an object in the driving support display device 1 of the present embodiment will be described. As shown in FIG. 9, in the present embodiment, in an optical flow support area Aop that is a range displayed in the rear lateral screens 204, an object is detected by the optical flow in which an object included in an image is detected by analyzing the moving direction and the speed of a point in the image over time. In contrast, in a pattern matching support area Apm that is a range displayed in the rearward screen 202, an object is detected by the pattern matching in which an object included in an image is detected by comparing the image with a predetermined pattern.

Figure 10:
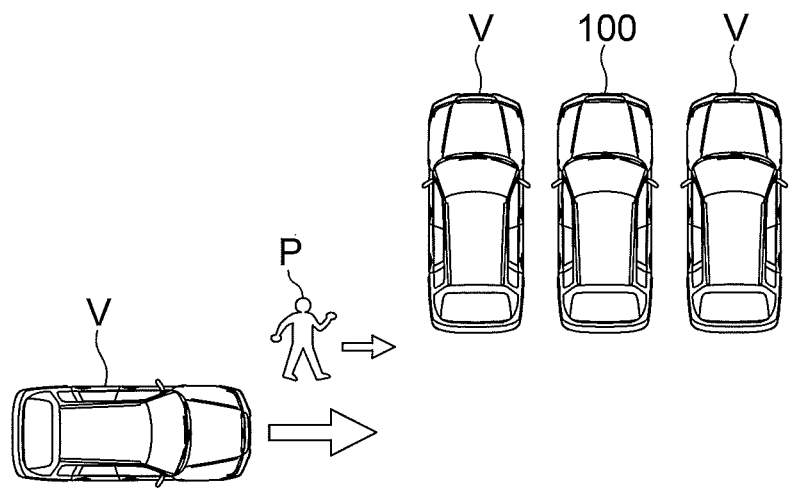
FIG. 10 is a plan view illustrating a driving support target when an object is present in the optical flow area of the driving support display device according to the embodiment.

In the example of FIG. 9, another vehicle V approaches the host vehicle 100 from the optical flow support area Aop, and the moving object detecting section 21 of the ECU 20 of the driving support display device 1 detects the another vehicle V by the optical flow. In an example of FIG. 10, another vehicle V and a pedestrian P approach the host vehicle 100 from the optical flow support area Aop, and the moving object detecting section 21 detects the another vehicle V and the pedestrian P by the optical flow. In both examples, in the optical flow support area Aop, it is possible to detect a moving object that approaches from a distance. In the optical flow support area Aop, it is not possible to detect a stationary object. However, if the stationary object is not present in the vicinity of the host vehicle 100, since there is no possibility that the stationary object comes into contact with the host vehicle 100, only a moving object is detected by the optical flow in the optical flow support area Aop.

Figure 11:
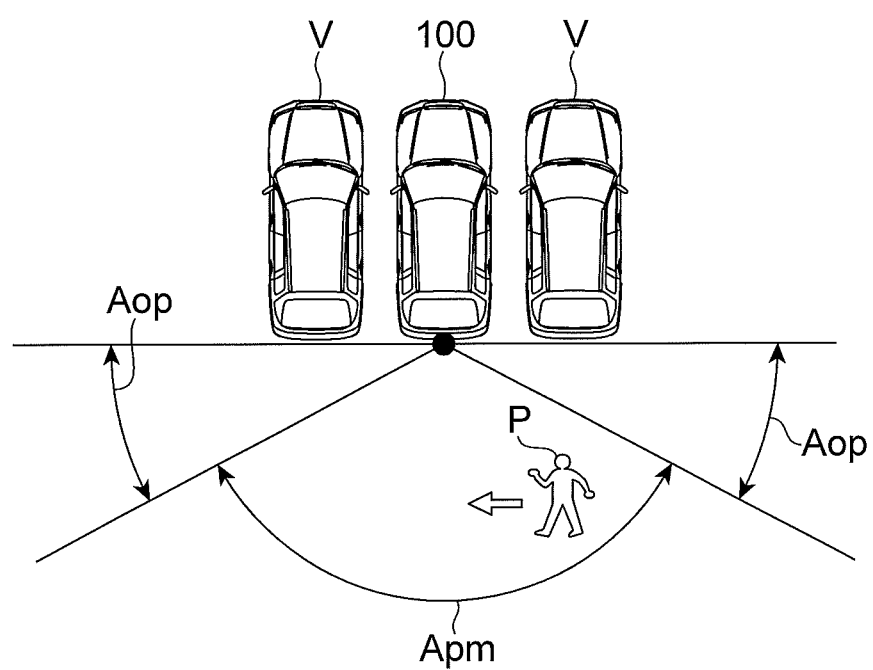
FIG. 11 is a plan view illustrating a situation when an object is present in a pattern matching area of the driving support display device according to the embodiment.
Figure 12:
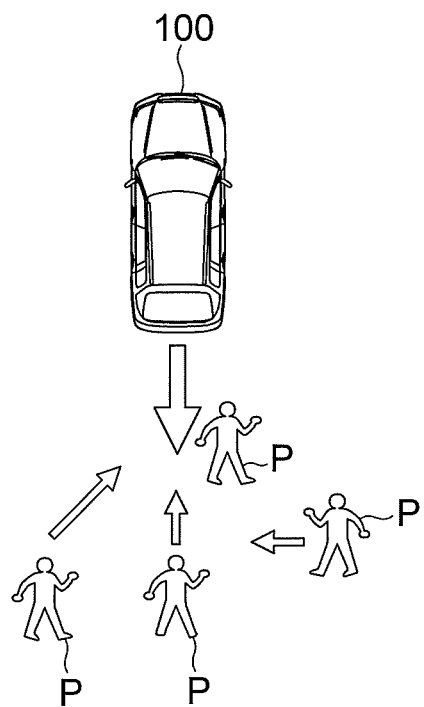
FIG. 12 is a plan view illustrating a driving support target when an object is present in the pattern matching area of the driving support display device according to the embodiment.

In an example of FIG. 11, a pedestrian P approaches the host vehicle 100 from the pattern matching support area Apm, and the moving object detecting section 21 of the ECU 20 of the driving support display device 1 detects the pedestrian P by the pattern matching. In an example of FIG. 12, pedestrians P who are moving from the pattern matching support area Apm to the host vehicle 100 and a stationary pedestrian P are present, and the moving object detecting section 21 detects the respective pedestrians P by the pattern matching. In both examples, in the pattern matching support area Apm, it is possible to detect a moving object and a stationary object in the vicinity of the host vehicle 100. In the pattern matching support area Apm, since there is a possibility that the stationary object comes into contact with the host vehicle 100 in a moving range of the host vehicle 100, it is necessary to detect the stationary object. In the pattern matching support area Apm, the moving object detecting section 21 compares a human pattern that is mainly used as a comparison pattern with an object in an image. With respect to the vicinity of the host vehicle 100, it is possible to detect a stationary object by a sonar.

Figure 13:
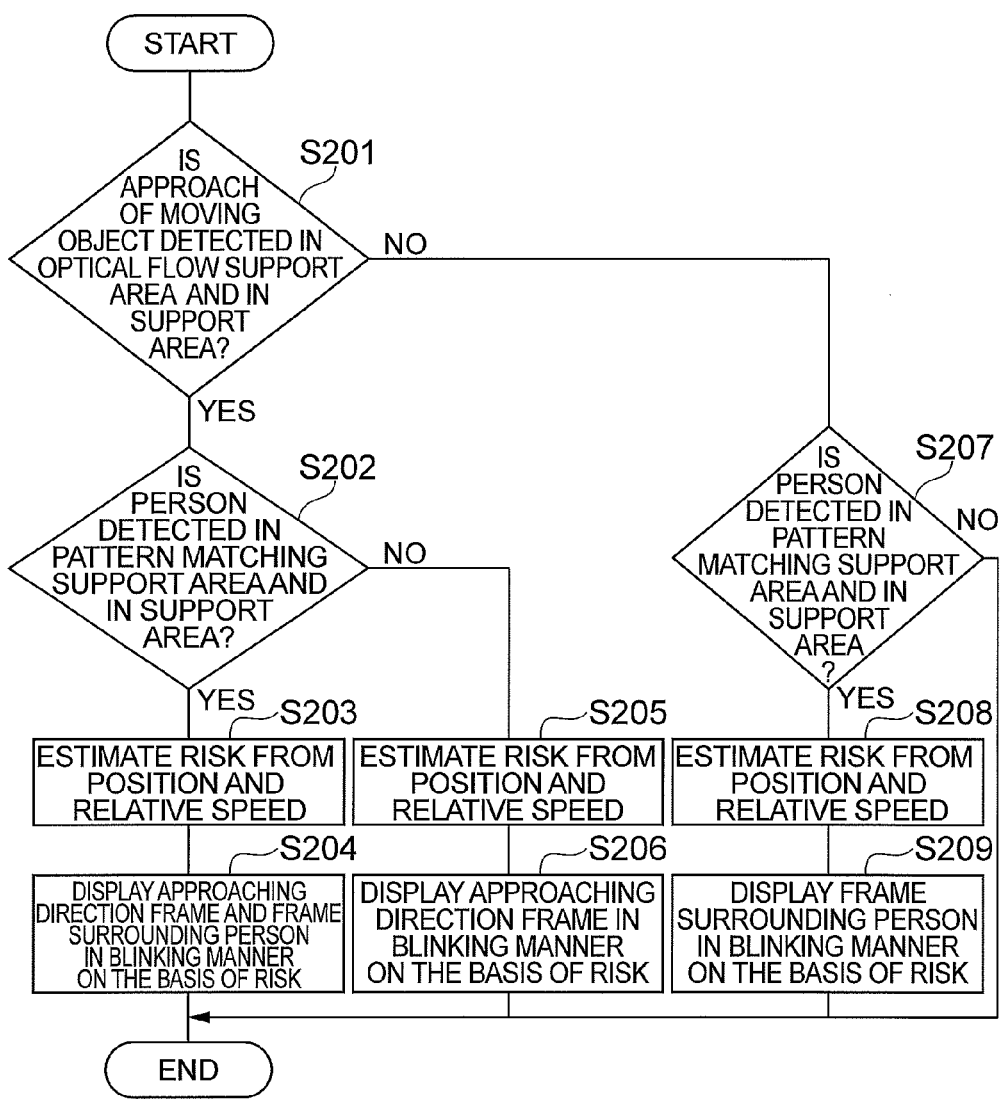
FIG. 13 is a flowchart illustrating an operation, according to each support area and each target, of the driving support display device according to the embodiment.
Figure 14:
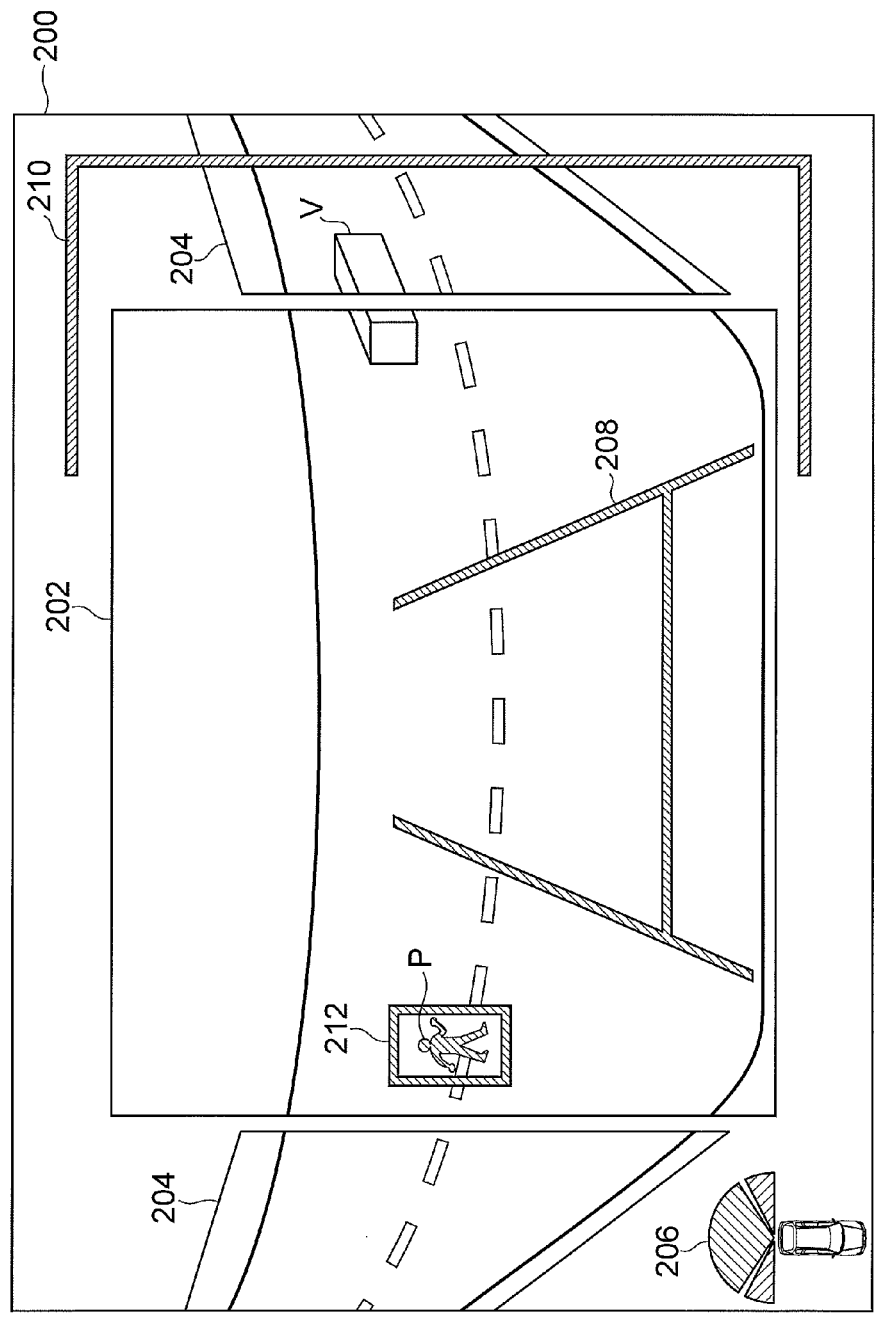
FIG. 14 is a diagram illustrating a display image when a moving object is present in the optical flow area of the driving support display device according to the present embodiment and a person is present at the pattern matching area thereof.

As shown in FIG. 13, if the moving object detecting section 21 of the ECU 20 of the driving support display device 1 detects that a moving object such as another vehicle V or a person approaches in the optical flow support area Aop and in the support area A (S201), and if the moving object detecting section 21 detects that an object such as a pedestrian P is present in the pattern matching support area Apm and in the support area A (S202), the risk estimating section 24 of the ECU 20 estimates the risk from the position and the relative speed of the object (S203). The display control section 25 of the ECU 20 displays the moving object approaching detection frame 210 that surrounds a part of the rear lateral screen 204 on a side where the another vehicle V approaches and a pedestrian detection frame 212 that surrounds the pedestrian P in the rearward screen 202 and the rear lateral screen 204, as shown in FIG. 14, in a blinking manner on the basis of the risk (S204).

The risk estimating section 24 estimates that the risk of the corresponding object becomes higher as the position of the object becomes closer to the host vehicle 100. The risk estimating section 24 estimates that the risk of the object becomes higher as the relative speed of the object with respect to the host vehicle 100 becomes higher. The display control section 25 makes a display time of the moving object approaching detection frame 210 and the pedestrian detection frame 212 earlier as the risk estimated by the risk estimating section 24 becomes higher. The display control section 25 makes a blinking interval of the moving object approaching detection frame 210 and the pedestrian detection frame 212 shorter as the risk estimated by the risk estimating section 24 becomes higher.

Alternatively, the display control section 25 may perform a display so that the luminance of the moving object approaching detection frame 210 and the pedestrian detection frame 212 is higher as the risk estimated by the risk estimating section 24 is higher. Alternatively, the display control section 25 may perform a display so that colors of the moving object approaching detection frame 210 and the pedestrian detection frame 212 are changed as the risk estimated by the risk estimating section 24 increases. For example, the display control section 25 may perform a display so that the colors of the moving object approaching detection frame 210 and the pedestrian detection frame 212 are sequentially changed to blue, yellow and red as the risk estimated by the risk estimating section 24 increases.

If the moving object detecting section 21 detects that a moving object such as another vehicle V or a person approaches in the optical flow support area Aop and in the support area A (S201), and if the moving object detecting section 21 does not detect that an object such as a pedestrian P is present in the pattern matching support area Apm and in the support area A (S202), the risk estimating section 24 estimates the risk from the position and the relative speed of the object (S205). The display control section 25 displays the moving object approaching detection frame 210 that surrounds a part of the rear lateral screen 204 on a side where the another vehicle V approaches in the rear lateral screen 204, as shown in FIG. 6, in a blinking manner on the basis of the risk, as described above (S206).

Figure 15:
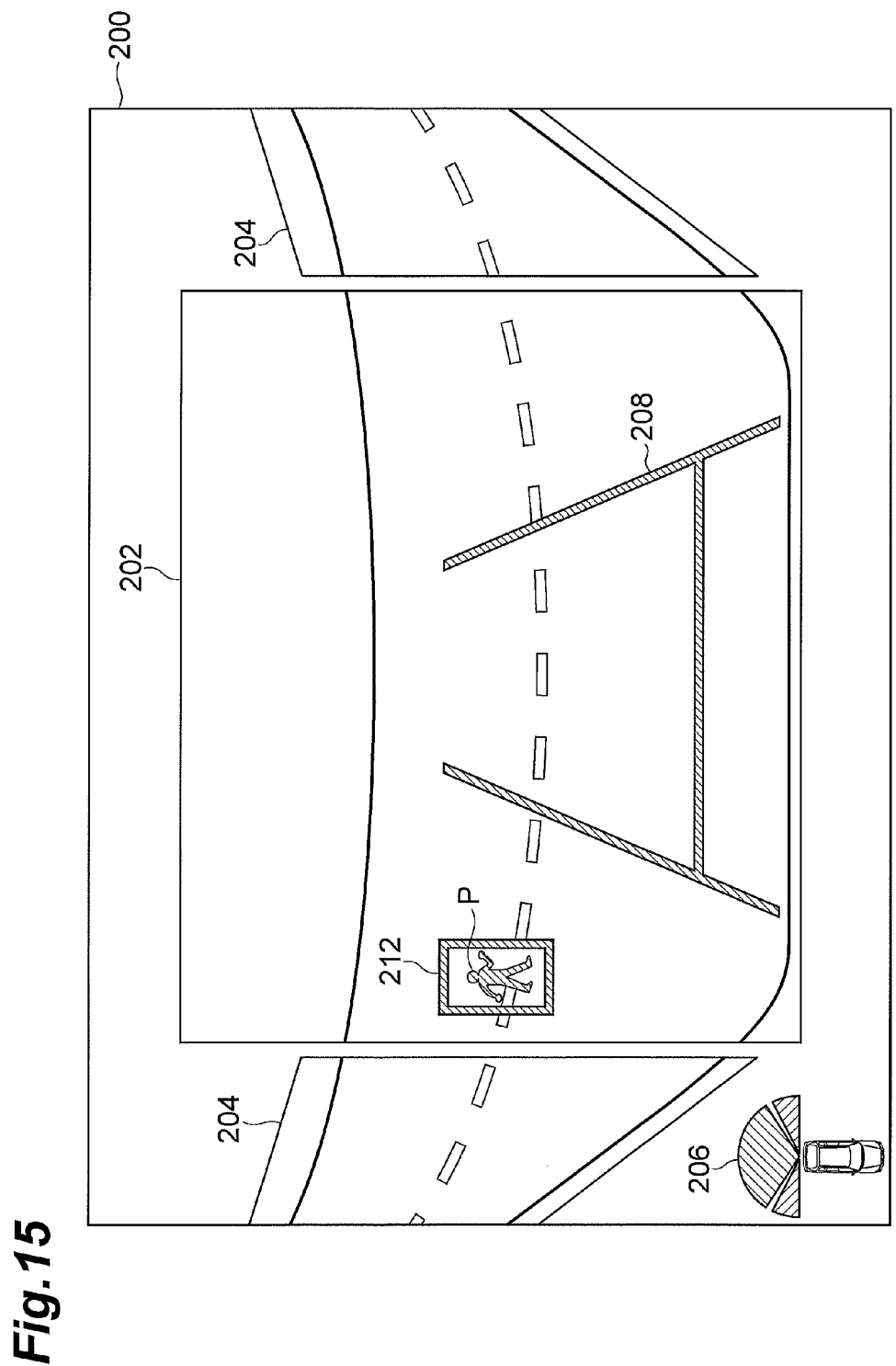
FIG. 15 is a diagram illustrating a display image when a person is present in the pattern matching area of the driving support display device according to the embodiment.

If the moving object detecting section 21 detects that a moving object such as another vehicle V or a person approaches in the optical flow support area Aop and in the support area A (S201), and if the moving object detecting section 21 detects that an object such as a pedestrian P is present in the pattern matching support area Apm and in the support area A (S207), the risk estimating section 24 estimates the risk from the position and the relative speed of the object (S208). The display control section 25 displays the moving object approaching detection frame 210 that surrounds a part of the rear lateral screen 204 on a side where the another vehicle V approaches and the pedestrian detection frame 212 that surrounds the pedestrian P in the rearward screen 202 and the rear lateral screen 204, as shown in FIG. 15, in a blinking manner on the basis of the risk, as described above (S204).

According to the present embodiment, in the driving support display device 1 that includes the rear view wide angle camera 11, the ECU 20 and the display 30 that display the rearward image captured by the rear view wide angle camera 11, since the display control section 25 of the ECU 20 and the display 30 divide the rearward image into the right and the left rear lateral screens 204 and the central rearward screen 202 to be displayed, the driver can easily recognize the display position. Further, since the display control section 25 and the display 30 do not display the same image in the right and the left rear lateral screens 204 and the central rearward screen 202, the driver can easily understand the distance between the object in the rearward image and the host vehicle 100. Further, since the display control section 25 performs the distortion correction of correcting the distortion of the rearward image displayed in the right and the left rear lateral screens 204, the driver can see the rearward image that is easily viewable due to the distortion correction. Further, since the display control section 25 forms the right and the left rear lateral screens 204 in a distortion-corrected shape, the driver can easily recognize the approaching position of the object in the rearward image.

Further, the display control section 25 performs the distortion correction of correcting the distortion, due to the aberration of the wide angle lens, of images of the surrounding area displayed in the right and the left rear lateral screens 204, so that the vertical height of the rear lateral screen 204 is narrowed toward the left side of the left rear lateral screen 204 and the right side of the right rear lateral screen 204, the upper and the lower sides of the left rear lateral screen 204 forms the shape going toward the upper left side, and the upper and the lower sides of the right rear lateral screen 204 forms the trapezoid having portions going toward the upper right side. Thus, the driver can easily recognize the position where the rearward image is captured. Further, the driver can easily recognize the approaching position of the object in the rearward image.

Further, the display control section 25 displays the right and the left rear lateral screens 204 and the central rearward screen 202, respectively, at intervals. Thus, the driver can easily recognize that the right and the left rear lateral screens 204 and the central rearward screen 202 are respectively divided.

Further, the display control section 25 displays the moving object approaching detection frame 210 indicating the approach of the object when the object included in the rearward image of either of the right and the left rear lateral screens 204 approaches the host vehicle 100. Thus, even though the driver watches the central rearward screen 202, the driver can easily notice an object that approaches from a lateral side.

That is, in the present embodiment, by increasing the size of the central rearward screen 202, it is possible to easily use the display screen 200 as a rearward guiding monitor. By increasing the size of the rearward screen 202 and reducing the size of the rear lateral screens 204, an object that approaches from a lateral side becomes small in size in the screen. However, even though the driver watches the central rearward screen 202, the driver can easily notice the object that approaches from the lateral side by the moving object approaching detection frame 210. Further, in the present embodiment, switching the screen from normal to a wide angle is not complicated.

Further, according to the present embodiment, in the driving support display device 1 that includes the rear view wide angle camera 11, the ECU 20 and the display 30 that display the rearward image captured by the rear view wide angle camera 11, the display control section 25 of the ECU 20 and the display 30 can display the moving object approaching detection frame 210 and the pedestrian detection frame 212 that support driving of the driver of the host vehicle 100 while dividing the rearward image into the plural screens to be displayed, and change the number of displayed screens between when the moving object approaching detection frame 210 is displayed and when the moving object approaching detection frame 210 is not displayed. Thus, the driver can easily recognize the operation and non-operation of the system that displays the moving object approaching detection frame 210.

Further, the display control section 25 can divide the rearward image into the right and the left rear lateral screens 204 and the central rearward screen 202 to be displayed, and displays the right and the left rear lateral screens 204 and the central rearward screen 202 when displaying the moving object approaching detection frame 210 and the pedestrian detection frame 212 and displays only the central rearward screen 202 when not displaying the moving object approaching detection frame 210. Thus, the driver can easily recognize the operation and non-operation of the system that displays the moving object approaching detection frame 210. Further, even though the system that displays the moving object approaching detection frame 210 does not operate, since the central rearward screen 202 is displayed, it is possible to use the central rearward screen 202 for rearward monitoring.

Further, the display control section 25 displays the moving object approaching detection frame 210 indicating the approach of the object when the object included in the right and the left rear lateral screens 204 approaches the host vehicle 100. Thus, even though the driver watches the central screen, the driver can easily notice the object that approaches from the lateral side.

Further, the display control section 25 does not display the moving object approaching detection frame 210 when either the speed or the steering angle of the host vehicle 100 is equal to or greater than the predetermined threshold value. As the method of detecting the approach of the object, there is radar, lidar, sonar, image recognition or the like, but erroneous detection or non-detection may occur when the speed or the steering angle of the vehicle is large. The erroneous detection and non-detection cause the driver to have a distrust of the system. Thus, the moving object approaching detection frame 210 is not displayed when the speed or the steering angle of the host vehicle 100 is equal to or greater than the threshold value, and thus, it is possible to prevent the erroneous detection and non-detection of the object that approaches the host vehicle 100.

Further, according to the present embodiment, in the driving support display device 1 that includes the rear view wide angle camera 11, the ECU 20 and the display 30 that display the rearward image captured by the rear view wide angle camera 11, the display control section 25 of the ECU 20 and the display 30 divide the rearward image into the right and the left rear lateral screens 204 and the central rearward screen 202 to be displayed, detect the object included in the image by comparing the image with the predetermined pattern with respect to the central rearward screen 202, detect the object included in the image by analyzing the moving direction and the speed of the point in the image over time with respect to the images of the right and the left rear lateral screens 204, and display the moving object approaching detection frame 210 and the pedestrian detection frame 212 indicating the presence of the detected object. Thus, it is possible to detect a person who is stationary in the vicinity of the front of the host vehicle 100, a person who is present in the vicinity of the front of the host vehicle 100 when the host vehicle 100 moves, or the like by the pattern matching scheme for comparing an image with a predetermined pattern, and to notify the driver of the presence of the detected person or the like. Further, by detecting a person, a vehicle and the like that approach from a distance on the lateral side of the host vehicle 100 by the optical flow scheme for analyzing the moving direction and the speed of a point in an image over time, it is possible to notify the driver of the presence of the detected person, vehicle and the like. Accordingly, it is possible to appropriately detect the object according to the position, the speed and the type of the object, and to display the detected object.

Further, the display control section 25 displays the pedestrian detection frame 212 that surrounds the pedestrian P when the pedestrian P included in the image of the central rearward screen 202 is detected, and displays the moving object approaching detection frame 210 that surrounds at least a part of either of the right and the left rear lateral screens 204 on which the object is detected when the object included in either image of the right and the left rear lateral screens 204 is detected. Thus, the driver can recognize that the schemes of detecting the object are different from each other in the central rearward screen 202 and in the right and the left rear lateral screens 204. That is, by making how the frame surrounds a screen different in the central rearward screen 202 and in the right and the left rear lateral screens 204, it is possible to notify the driver that a person is detected only in the central rearward screen.

The driver usually checks the lateral direction when starting to drive, and usually checks the central rear side when starting to drive and during movement. In the case of the movement, since it is necessary to quickly check the object, it is also possible to recognize the position of the object by the pedestrian detection frame 212 surrounding the object.

Figure 16:
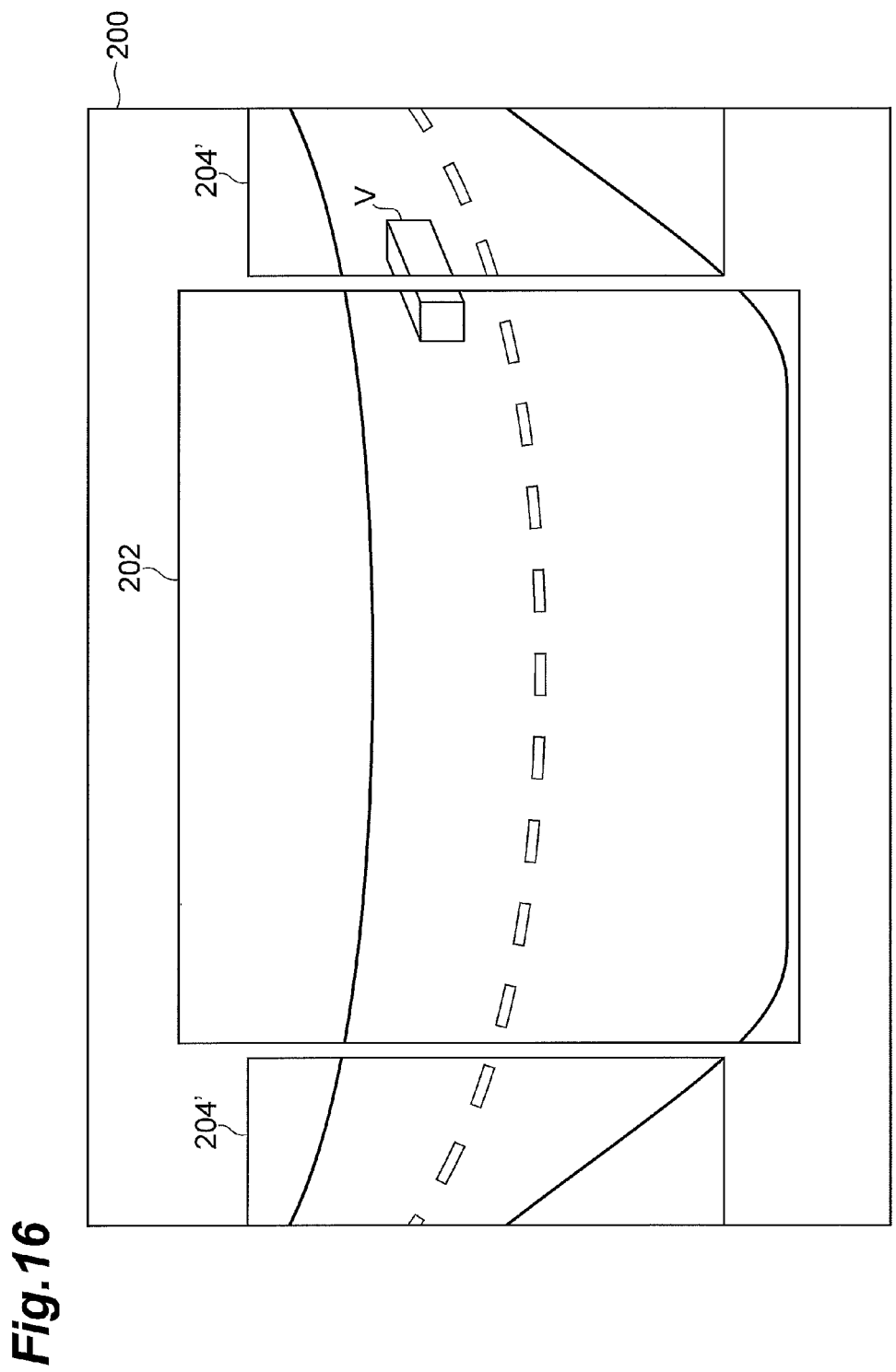
FIG. 16 is a diagram illustrating a display image according to another embodiment.

The invention is not limited to the above-described embodiments, and various modifications may be made in a range without departing from the spirit of the invention. For example, if the processing load of the driving support display device 1 in the embodiments is large, as shown in FIG. 16, the size of rear lateral screens 204' may be reduced according to distortion correction. As described above, the moving object approaching detection frame 210 that notifies the driver that the moving object is detected is changed according to the range where the object is detected. When the object is detected in the rear lateral screens 204', the moving object approaching detection frame 210 may be displayed only in the rear lateral screen 204'.

Figure 17:
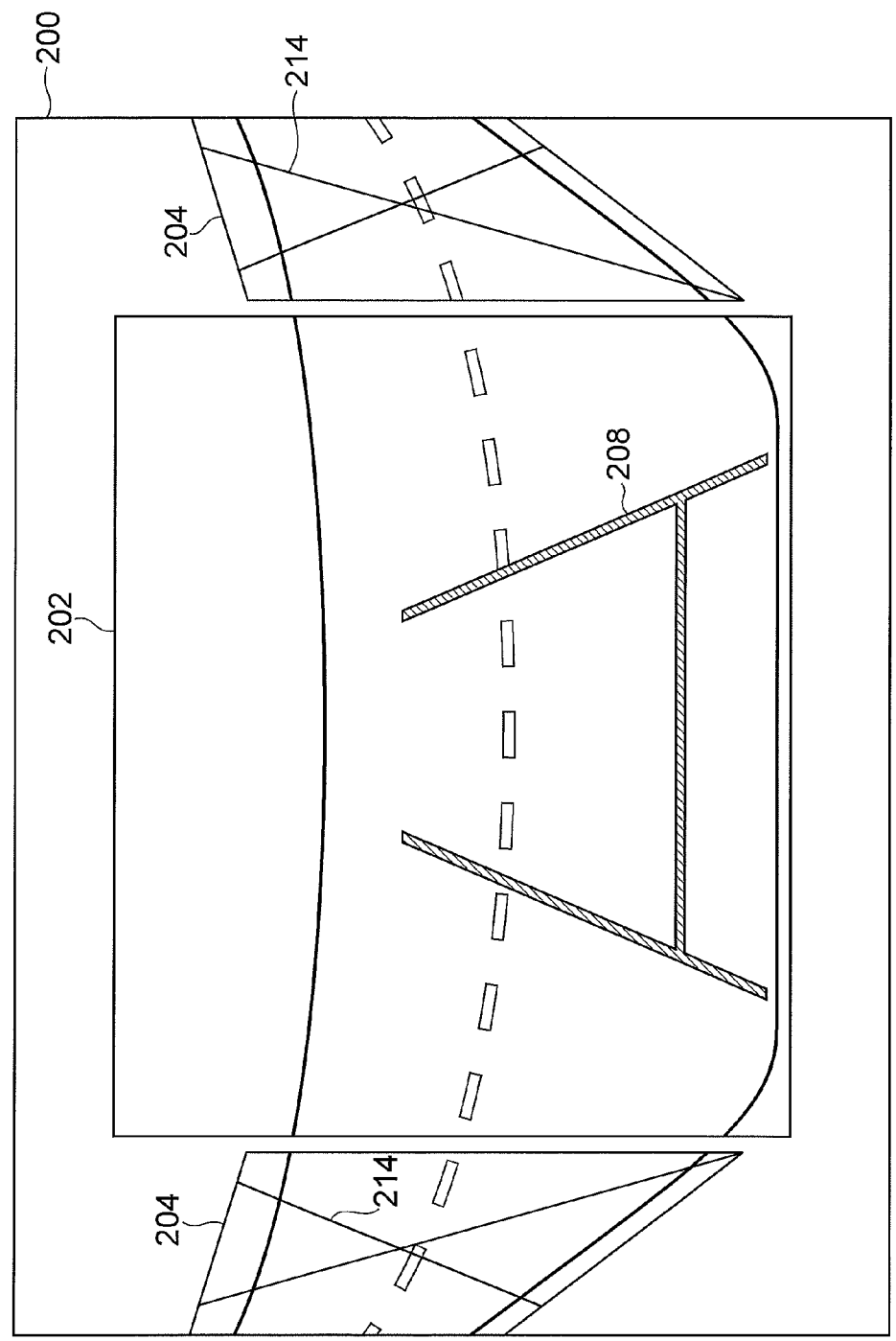
FIG. 17 is a diagram illustrating a display image according to still another embodiment.

Further, in the above-described embodiments, the rear lateral screens 204 are removed when the driving support system does not operate. However, if the rear lateral screens 204 are removed when the driving support system does not operate, a driver may feel that he or she cannot see the rear lateral screens 204 although wanting to see the rear lateral screens 204. Thus, as shown in FIG. 17, when the driving support system does not operate, it is possible to display a non-operation display line 214 in the rear lateral screens 204 while displaying the rear lateral screens 204.

INDUSTRIAL APPLICABILITY

According to an image display device and an image display method of an embodiment of the invention, it is possible to easily recognize operation and non-operation of a system that supports driving of a driver.

REFERENCE SIGNS LIST

1 Driving support display device
11 Rear view wide angle camera
12 Vehicle speed sensor
13 Steering angle sensor
14 Shift position sensor
20 ECU
21 Moving object detecting section
22 Moving object trajectory detecting section
23 Moving object position and relative speed detecting section
24 Risk estimating section
25 Display control section
30 Display
100 Host vehicle
200 Display screen
202 Rearward screen
204, 204' Rear lateral screen
206 Display range symbol
208 Vehicle width line
210 Moving object approaching detection frame
212 Pedestrian detection frame
214 Non-operating display line
A Support area
Aop Optical flow support area
Apm Pattern matching area
V Another vehicle
P Pedestrian

The invention claimed is:
1. An image display device comprising:
an image obtaining unit configured to obtain an image of a surrounding area of a vehicle;
an image display unit configured to display the image of the surrounding area obtained by the image obtaining unit; and
a display control section configured to divide the image of the surrounded area into a plurality of screens for displaying a driving support to a driver of the vehicle,
wherein the image display unit displays right and left rear lateral screens and a central rearward screen when an approaching object is detected and displays only the central rearward screen when the approaching object is not detected.

2. The image display device according to claim 1,
wherein the image display unit is configured to divide the image of the surrounding area into a left lateral screen, a central screen and a right lateral screen for display,
wherein the image display unit is configured to display the left lateral screen, the central screen and the right lateral screen when the driving support display is displayed, and
wherein the image display unit is configured to display only the central screen when at least the part of the driving support display is not displayed.

3. The image display device according to claim 1,
wherein the image display unit is configured to display, when an object included in the image of the surrounding area of either of the left lateral screen and the right lateral screen approaches the vehicle, the driving support display indicating the approach of the object.

4. The image display device according to claim 3,
wherein the image display unit is configured not to display, when either of a speed and the steering angle of the vehicle is equal to or greater than a predetermined threshold value, at least the part of the driving support display.

5. An image display method comprising:
obtaining an image of a surrounding area of a vehicle; and
displaying the image of the surrounding area obtained in the obtaining of the image of the surrounding area,
wherein displaying a driving support display indicating approach of an object included in the image of the surrounding area while dividing the image of the surrounding area into a plurality of screens to be displayed is possible in the displaying of the image of the surrounding area, and
wherein a number of the screens to be displayed between when the driving support display is displayed and when at least a part of the driving support display is not displayed, is changed, in the displaying of the image of the surrounding area.

* * * * *